June 19, 1962 M. W. CONNELL 3,040,284
TERMINATION FITTING FOR MINERAL-INSULATED METAL-SHEATH CABLE
Filed July 8, 1958

INVENTOR.
Maurice W. Connell
BY Popp and Sommer
ATTORNEYS.

United States Patent Office 3,040,284
Patented June 19, 1962

1

3,040,284
TERMINATION FITTING FOR MINERAL-
INSULATED METAL-SHEATH CABLE
Maurice W. Connell, Clarence Center, N.Y., assignor to
Conax Corporation, Buffalo, N.Y., a corporation of
New York
Filed July 8, 1958, Ser. No. 747,259
8 Claims. (Cl. 339—61)

This invention relates to an improved termination fitting for mineral-insulated metal-sheath cable.

Such a cable is a self-contained wiring system consisting of one or more solid conductors, spaced and insulated by an inert mineral material, magnesium oxide or magnesia, and encased in a seamless metallic sheath, usually of copper. The cable can withstand high temperatures and is water and gas tight, free from condensation, corrosion resistant and compact. Because of these features and the fact that it provides a grounded electrical system, mineral-insulated metal-sheath cable is used in such places as chemical plants, public utilities, refrigerated areas, breweries, ships, steel mills and other installations where its desirable properties can be advantageously employed. Switch junctions or outlet boxes are recommended at each point of termination and when two lengths of cable are to be connected.

While various forms of connectors or termination fittings have been devised for such cable, they are unsatisfactory for one reason or another. For example, one known form of termination fitting requires special tools to apply the fitting to the cable and involves a considerable expenditure of effort and time.

It is accordingly the principal object of the present invention to provide an improved termination fitting which is easy and quick to apply to mineral-insulated metal-sheath cable without the use of special fixtures and tools.

Another object is to provide such a termination fitting which effectively seals out moisture and combustible gases from the mineral insulation of the cable.

A further object is to provide such a termination fitting which affords a grounding path for the cable.

Other objects and advantages of the present invention will be apparent from the following detailed description and accompanying drawing wherein.

Figure 1:
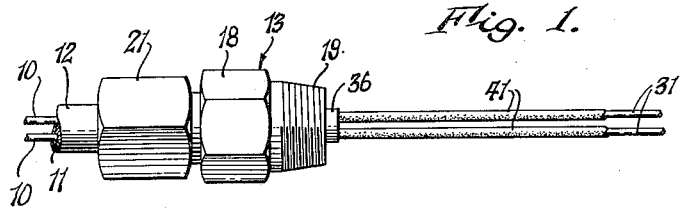
FIG. 1 is a side elevational view of a termination fitting constructed according to a preferred form of the invention and showing the fitting applied to a mineral-insulated metal-sheath cable.

The termination fitting embodying the present invention is shown as associated with a mineral-insulated metal-sheath cable having two conductors or wires 10, 10 spaced from each other and embedded in pulverulent magnesia 11 and encased by a cylindrical seamless metal sheath 12. While a cable with two conductors is illustrated it is understood that the fitting is adaptable for cable of this type having one or more conductors.

The termination fitting comprises an elongated gland body 13 having a bore 14 extending therethrough. The bore is reduced at one end to provide an annular inwardly facing shoulder 15 and at its other end is formed with an outwardly flaring or enlarging annular cam sur-

2 face 16. The central portion of the gland body is enlarged, as indicated at 18, to provide an external out-of-round shape to permit the application of a suitable tool such as a wrench. On one side of the central part 18 the gland body is shown as provided with a tapered pipe thread 19 and on the opposite side with a cylindrical external screw thread 20.

The fitting also comprises a tubular gland closure 21 having an opening 22 only slightly larger in diameter than the cable, an inwardly facing thrust shoulder 23 surrounding said opening and a cylindrical internal screw thread 24. The threads 20 and 24 are adapted to engage so that a threaded connection is provided between the gland closure and body which when tightened operates to overlap these parts. Any other means for drawing the gland closure and body together, and hence the aforesaid shoulders, may be provided. The periphery of the gland closure 21 is shown as having an out-of-round shape to permit the application of a suitable tool such as a wrench.

A ferrule 25 is shown as housed within the gland closure 21. This ferrule is a tubular member one end of which is adapted to engage the thrust shoulder 23 and the other end of which is formed to provide an enlarged head shown as including an annular raised external land 26 and an annular internal bead 28. The enlarged end portion of the ferrule is shown as having a pair of opposed slits 29 which extend inwardly from the adjacent end and axially for part of the length of the ferrule to provide a constrictable split portion.

The enlarged head of the ferrule 25 is adapted to be forced by the gland closure against the cam surface 16 on the gland body and constrict the split portion of the ferrule and hence the opening therethrough, for a purpose hereinafter described. When contact between the ferrule and cam surface 16 occurs it is desirable to prevent relative rotative movement therebetween. Means are provided to accomplish this and are preferably shown as axially extending ridges and grooves or knurling 30 provided on the periphery of the land 26, although any other suitably roughened surface may be provided on the land. The advantage of the axial knurling 30 shown is that it engraves the face of the cam surface 16 and thereby provides a mechanical interlock between the ferrule 25 and gland body 10 which prevents relative rotation therebetween.

For its other components the fitting is shown as including a lead wire 31, one for each conductor 10; a contact sleeve 32, one for each corresponding pair of wires 10 and 31; a preformed pot of insulating material 33; and a sealant in the form of a preformed tubular body of deformable insulating material 34.

The pot 33 is shown as a cylindrical body having a reduced cylindrical extension 36 at one end to form an external annular shoulder 38 adapted to engage the internal shoulder 15 of the gland body. The pot 33 is shown as having a cylindrical cavity or recess 39 from the base or inner end of which a wire passage 40 extends axially through the reduced extension 36. A passage 40 is provided for each of the lead wires 31 and is shown as counterbored for most of its length to receive insulating sleeving 41 on the corresponding lead wire. While the pot 33 may be made of any suitable solid rigid insulating material such as ceramic or fiber board, it is preferred to employ asbestos impregnated with a suitable binder.

The exposed end portion of each lead wire 31 is adapted to be received in the corresponding contact sleeve 32 which is made of an electrically conductive material. Each lead wire is inserted into its contact sleeve about halfway and soldered thereto. This leaves a portion of each contact sleeve which provides a socket for the reception of a cable conductor 10. The socket portion of each contact sleeve is preferably split as indicated at 42 to facilitate the insertion of the conductor and render the socket portion flexible so as to be capable of being clamped firmly to the conductor. The lead wires 31 are preferably the same size wires as the cable conductors 10.

Figure 4:
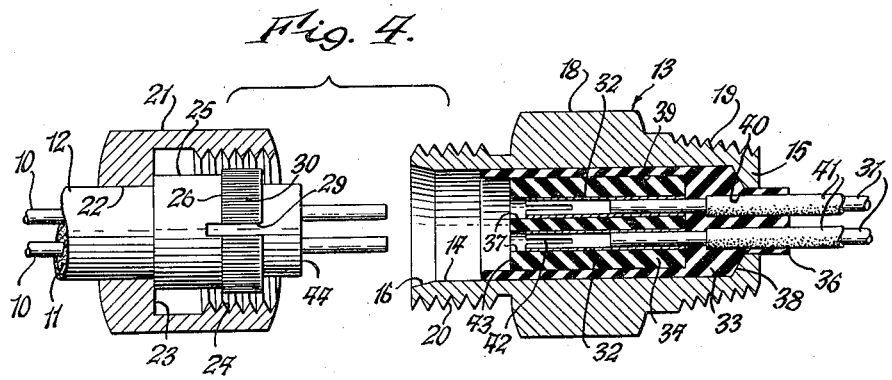
FIG. 4 is a view generally similar to FIG. 2 and showing the aforementioned components arranged in two sub-assemblies immediately prior to joining the same, most of the components being shown in section but others being shown in elevation.

The sealant body 34 has a through bore 37 for each contact sleeve 32 and is dimensioned so that it can be readily slid into the cavity 39 of the pot 33 and over the contact sleeves. When in such position as best shown in FIG. 4 the end face 43 of the sealant body preferably extends outwardly beyond the ends of the contact sleeves 32 and inwardly of the open end of the pot 33. The exposed sleeve portion of the pot 33 has an internal diameter about the same as the outside diameter of the metal sheath 12 so that the portion of the cable adjacent the base of the bared portions of the cable conductors can be intimately embraced by the pot 33. The end face 43 of the sealant body 34 is shown as adapted to abuttingly engage the exposed end face 44 of the cable. The gland body 13 has an axial length such that its internal cam surface 16 is arranged outwardly of the end of the insulator pot 33. The sealant body 34 is preformed into its tubular shape of any suitable soft, compressible and flowable solid insulating material such as green or uncured lava, or polytetrafluoroethylene.

The termination fitting may be provided as an assembly including the subassembly shown at the right of FIG. 4 and the gland nut 21 and ferrule 25 shown at the left of this figure. To provide the right hand sub-assembly, the lead wires 31 are soldered to the contact sleeves 32. These sleeves 32 are then inserted into the respective bores 37 of the sealant body and the lead wires threaded through the respective passages 40 in the insulator pot 33. The sealant body 34 is then slid into the cavity 39 of the insulator pot 33. This pot with its contents is then inserted into the enlarged part of the bore 14 of the gland body with the reduced extension 36 entering the reduced end portion of the bore 14, until the external shoulder 38 on the pot bottoms on the internal shoulder 15 on the gland body 13. The insulating sleeving 41 for the lead wires 31 may be applied at any time.

To prepare the cable for application of the termination fitting, the cable is cut off to the desired length. With a tube cutter the metal sheath 12 is cut back a short distance and the mineral insulation 11 scraped away to provide the end face 44 and the bared portions of the conductors 10. This prepared end of the cable is then threaded through the gland nut 21 and ferrule 25, as shown at the left of FIG. 4.

Figure 2:
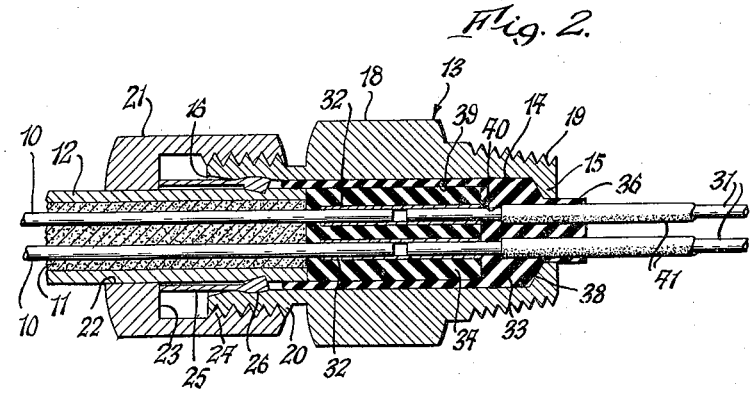
FIG. 2 is an enlarged vertical sectional view of the fitting and cable shown in FIG. 1 and illustrating the condition of the various parts after final assembly.
Figure 3:
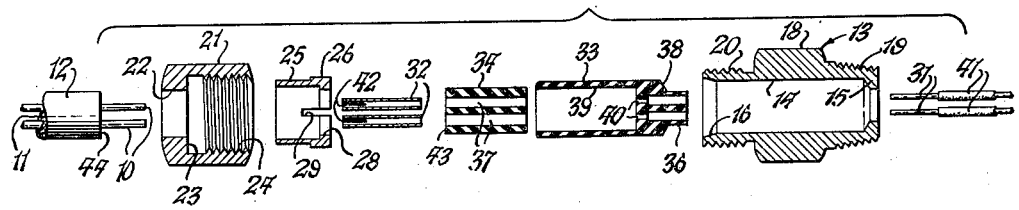
FIG. 3 is an exploded view on a reduced scale of the various components of the fitting, in section, and cable prior to assembly.

Thereupon the bared portions of the conductors are inserted into the sockets of the contact sleeves 32 preferably until the end faces 43 and 44 abut each other. The threads 20 and 24 are joined. A wrench applied to the out-of-round part 18 of the gland body 13 will serve to hold the same stationary. With another wrench applied to the gland nut 21 the same is tightened or screwed down upon the gland body thereby drawing the gland body and nut together. Drawing the gland body and nut together forces the knurled land 26 on the ferrule 25 into engagement with the progressively contracting cam surface 16 and causes the constrictable split portion of the ferrule to clamp down upon the metal sheath 12 of the cable. Continued tightening of the gland nut 21 forces the axial knurling 30 to engrave the cam surface 16 and prevent relative rotation between the ferrule 25 and the gland body 13. This also causes the internal bead 28 to indent the metal sheath 12 of the cable. Thus a mechanical interlocking of the cable to the ferrule takes place. Still further tightening of the gland nut 21, which is still freely rotatable on the cable, moves the cable axially with the gland nut and serves to compress the sealant body 34 by forcing the abutting faces 43 and 44 forcibly together. Compression of the sealant body also causes the socket portion of the contact sleeves 32 to be firmly clamped to the cable conductors 10. In the end the various parts assume the condition shown in FIG. 2. It will be noted that the sealant body 34 has flowed under compression to fill all voids and completely covers the cut off face 44 of the cable. A very tight, moisture proof termination for the cable is thus provided. The contact of the ferrule 25 with the metal sheath 12 of the cable and also with the gland nut 21 and gland body 13 provides a grounding path for the cable.

The external tapered thread 19 on the gland body provides a hub thread for mounting the termination fitting on a switch or junction box (not shown). As a practical matter the gland body 13 is first mounted on such a box before the gland nut 21 is tightened on the gland body.

From the foregoing it will be seen that the present invention provides a termination fitting for mineral-insulated metal-sheath electric cable which is simple in construction and easy and quick to apply to the cable, requiring only general purpose and commonly available tools and without requiring the use of special fixtures or tools.

I claim:

1. In a termination fitting for mineral-insulated metal-sheath cable, the combination comprising a gland body having a generally conical cam surface, a gland nut having a threaded engagement with said gland body, and a constrictable ferrule within said gland nut and having an external axially knurled surface on its inner end portion adapted to be forced by said gland nut into engagement with said cam surface so as to be engraved by said knurled surface to prevent relative rotation between said ferrule and gland body and to constrict the opening through said ferrule when said gland body and nut are tightened, whereby when said cable is threaded through said ferrule and gland nut and said gland body and nut are thereafter tightened said ferrule clutches said cable so as to move said cable without twisting toward said gland body.

2. In a termination fitting for mineral-insulated metal-sheath cable, the combination comprising a gland body, a gland nut having a threaded engagement with said gland body, a ferrule within said gland nut and axially split part way from its inner end, a thrust shoulder on said gland nut for engaging the outer end of said ferrule, an internal bead on the inner end of said ferrule, an external axially knurled surface on the inner end portion of said ferrule, and a generally conical cam surface on said gland body adapted to be engaged by said knurled surface and to be engraved thereby so as to prevent relative rotation between said ferrule and gland body, said ferrule including its said bead being adapted to be forced by said gland nut into engagement with said gland body so as to constrict the opening through said ferrule when said gland body and nut are tightened, whereby when said cable is threaded through said ferrule and gland nut and said gland body and nut are thereafter tightened, the constrictable split portion of said ferrule indents said metal sheath and compels said cable to move with said gland nut toward said gland body.

3. A termination fitting for mineral-insulated metal-sheath cable having at least one conductor, said fitting comprising a gland body, an electrically conductive socket arranged within said body, a lead wire connected to said socket and extending exteriorly of said gland body, a body of insulating material surrounding said socket and having an end face projecting beyond the corresponding end of said socket, said socket being adapted to slidingly and engagingly receive a bared portion of said conductor of said cable and said projecting end face being adapted to abuttingly engage the exposed end face of said cable at the base of said bared portion, a gland nut having a threaded engagement with said gland body, a constrictable ferrule within said gland nut, a cam surface on said gland body and adapted to be engaged by said ferrule so as to constrict the opening through said ferrule when said gland body and nut are tightened, and mechanical interlocking means for preventing relative rotation between said ferrule and gland body when said gland nut is tightened, whereby when said cable is threaded through said ferrule and gland nut and said bared portion is inserted into said socket and said gland body and nut are thereafter tightened the constrictable portion of said ferrule indents said metal sheath and said end faces are forced against each other.

4. A termination fitting for mineral-insulated metal-sheath cable having at least one conductor, said fitting comprising a gland body, an electrically conductive socket arranged within said body, a lead wire connected to said socket and extending exteriorly of said gland body, a body of insulating material surrounding said socket and having an end face projecting beyond the corresponding end of said socket, said socket being adapted to slidingly and engagingly receive a bared portion of said conductor of said cable and said projecting end face being adapted to abuttingly engage the exposed end face of said cable at the base of said bared portion, a gland nut having a threaded engagement with said gland body, a constrictable ferrule within said gland nut and axially split part way from its inner end, a thrust shoulder on said gland nut for engaging the outer end of said ferrule, an internal bead on the inner end of said ferrule, an external knurled surface on the inner end portion of said ferrule, and a cam surface on said gland body adapted to be engaged by said knurled surface and to be engraved thereby so as to prevent relative rotation between said ferrule and gland body, said ferrule including its said head being adapted to be forced by said gland nut into engagement with said gland body so as to constrict the opening through said ferrule when said gland body and nut are tightened, whereby when said cable is threaded through said ferrule and gland nut and said bared portion is inserted into said socket and said gland body and nut are thereafter tightened the constrictable split portion of said ferrule indents said metal sheath and said end faces are forced against each other.

5. A termination fitting for mineral-insulated metal-sheath cable having at least one conductor, said fitting comprising a gland body having a recess, a preformed pot of insulating material arranged in said recess, a preformed tubular body of deformable insulating material arranged within the cavity of said pot, an electrically conductive socket sleeve arranged in the bore of said tubular body so that the end face of said tubular body projects beyond the corresponding end of said sleeve, a lead wire connected to said sleeve and extending exteriorly of said gland body, said sleeve being adapted to engagingly receive a bared portion of said conductor of said cable and said projecting end face being adapted to abuttingly engage the exposed end face of said cable at the base of said bared portion, a tubular gland closure, means for drawing said gland body and closure toward each other, and a constrictable ferrule within said gland closure and adapted to be forced thereby into engagement with said gland body so as to constrict the opening through said ferrule when said gland body and closure are drawn together, whereby when said cable is threaded through said ferrule and gland closure and said bared portion is inserted into said sleeve and said gland body and closure are thereafter drawn together the constrictable portion of said ferrule indents said metal sheath and said end faces are forced against each other and said tubular body is compressively deformed to fill all voids.

6. A termination fitting for mineral-insulated metal-sheath cable having at least one conductor, said fitting comprising a gland body having a recess, a preformed pot of insulating material arranged in said recess and having a cylindrical cavity the diameter of which is about the same as the outside diameter of said cable, a preformed tubular body of deformable insulating material arranged within said cavity and having an end face arranged inwardly of the end of said pot, an electrically conductive socket sleeve arranged in the bore of said tubular body so that said end face projects beyond the corresponding end of said sleeve, a lead wire connected to said sleeve and extending exteriorly of said gland body, said sleeve being partially split from said end thereof and adapted to engagingly receive a bared portion of said conductor of said cable and said projecting end face being adapted to abuttingly engage the exposed end face of said cable at the base of said bared portion so that the adjacent portion of said cable is embraced by said pot, a tubular gland closure, means for drawing said gland body and closure toward each other, and a constrictable ferrule within said gland closure and adapted to be forced thereby into engagement with said gland body so as to constrict the opening through said ferrule when said gland body and closure are drawn togethehr, whereby when said cable is threaded through said ferrule and gland closure and said bared portion is inserted into said sleeve and said gland body and closure are thereafter drawn together the constrictable portion of said ferrule indents said metal sheath and said end faces are forced against each other and said tubular body is compressively deformed to fill all voids and clamp said sleeve to said bared portion.

7. A termination fitting for mineral-insulated metal-sheath cable having at least one conductor, said fitting comprising a gland body having a bore extending therethrough, said bore being reduced at one end to provide an inwardly facing shoulder and at its other end having a cam surface, a preformed pot of insulating material arranged in said bore and engaging said shoulder and having a recess in one end and a wire passage in the other end and leading to said recess, a lead wire arranged in said passage and having an end portion extending into said recess, a contact sleeve secured to said end portion of said wire and projecting therefrom to provide a socket for the reception of a bared portion of said conductor of said cable, a preformed tubular body of deformable insulating material arranged in said recess and surrounding said sleeve and having an end face projecting beyond the corresponding end of said sleeve, said projecting end face being adapted to abuttingly engage the exposed end face of said cable at the base of said bared portion, a tubular gland closure, means for drawing said gland body and closure toward each other, and a constrictable ferrule within said gland closure and adapted to be forced thereby into engagement with said cam surface so as to constrict the opening through said ferrule when said gland body and closure are drawn together, whereby when said cable is threaded through said ferrule and gland closure and said bared portion is inserted into said socket and said gland body and closure are thereafter drawn together the constrictable portion of said ferrule indents said metal sheath and said end faces are forced against each other and said tubular body is compressively deformed to fill all voids.

8. A termination fitting for mineral-insulated metal-sheath cable having at least one conductor, said fitting comprising a gland body having a bore extending therethrough, said bore being reduced at one end to provide an inwardly facing shoulder and at its other end having an outwardly enlarging cam surface, a preformed pot of insulating material arranged in said bore and engaging said shoulder and having a cylindrical cavity in one end and a wire passage in the other end and leading to said cavity, the diameter of said cavity being about the same as the outside diameter of said cable, a lead wire arranged in said passage and having an end portion extending into said cavity, a contact sleeve secured to said end portion of said wire and projecting therefrom, such projecting part of said sleeve being partially split inwardly from the end thereof remote from said wire to provide a socket for the reception of a bared portion of said conductor of said cable, a preformed tubular body of deformable insulating material arranged in said cavity and surrounding said sleeve and having an end face projecting beyond said remote end of said sleeve but arranged inwardly of the end of said pot, said projecting end face being adapted to abuttingly engage the exposed end face of said cable at the base of said bared portion so that the adjacent portion of said cable is embraced by said pot, a gland nut having a threaded engagement with said gland body, a thrust shoulder on said gland nut, a constrictable ferrule within said gland nut and engageable at one end with said thrust shoulder and partially split inwardly from its opposite end, said ferrule at said opposite end thereof having an enlarged head, the periphery of said head having a roughened surface and adapted to engage said cam surface to prevent relative rotation between said ferrule and gland body, said ferrule being adapted to be forced by said gland nut into engagement with said cam surface so as to constrict the opening through said ferrule when said gland body and nut are tightened, whereby when said cable is threaded through said ferrule and gland nut and said bared portion is inserted into said socket and said gland body and nut are thereafter tightened the constrictable split portion of said ferrule indents said metal sheath and said end faces are forced against each other and said tubular body is compressively deformed to fill all voids and clamp said socket to said bared portion.

References Cited in the file of this patent

UNITED STATES PATENTS

| 2,064,440 | Meeker | Dec. 15, 1936 |
| 2,215,476 | Peters | Sept. 24, 1940 |
| 2,566,993 | Parsons | Sept. 4, 1951 |
| 2,579,529 | Woodling | Dec. 25, 1951 |
| 2,581,500 | Schoonmaker | Jan. 8, 1952 |
| 2,603,682 | Uline et al. | July 15, 1952 |
| 2,657,252 | Mildner et al. | Oct. 27, 1953 |

FOREIGN PATENTS

| 716,844 | Great Britain | Oct. 13, 1954 |